(12) United States Patent
Hwang (10) Patent No.: US 12,375,002 B2
(45) Date of Patent: Jul. 29, 2025

(54) SWITCHING POWER CONVERTER AND CONTROLLER FOR A SWITCHING POWER CONVERTER

(71) Applicant: Champion Microelectronic Corporation, Hsinchu (TW)

(72) Inventor: Jeffrey Hwang, Saratoga, CA (US)

(73) Assignee: Champion Microelectronic Corporation (TW)

( * ) Notice: Subject to any disclaimer, the term of this patent is extended or adjusted under 35 U.S.C. 154(b) by 351 days.

(21) Appl. No.: 18/108,345

(22) Filed: Feb. 10, 2023

(65) Prior Publication Data

US 2023/0198414 A1 Jun. 22, 2023

Related U.S. Application Data

(63) Continuation of application No. 16/438,435, filed on Jun. 11, 2019, now Pat. No. 11,606,036.

(51) Int. Cl.
*H02M 3/335* (2006.01)
*H02M 1/08* (2006.01)
(Continued)

(52) U.S. Cl.
CPC ....... *H02M 3/33569* (2013.01); *H02M 1/083* (2013.01); *H02M 1/34* (2013.01);
(Continued)

(58) Field of Classification Search
CPC .......... H02M 3/01; H02M 3/015; H02M 3/22; H02M 3/24; H02M 3/28; H02M 3/285; H02M 3/315; H02M 3/3155; H02M 3/335; H02M 3/33507; H02M 3/33515; H02M 3/33523; H02M 3/3353; H02M 3/33538; H02M 3/33546; H02M 3/33553; H02M 3/33561; H02M 3/33569; H02M 3/33576; H02M 1/007; H02M 1/08; H02M 1/083; H02M 1/32; H02M 1/34; H02M 1/42; H02M 1/4208; H02M 1/4241; H02M 1/4258; H02M 1/0009; H02M 1/0016; H02M 1/0019; H02M 1/0022;

(Continued)

(56) References Cited

U.S. PATENT DOCUMENTS 10,461,653 B1 * 10/2019 Wong ................ H02M 3/33507
2018/0062529 A1 * 3/2018 Song ................. H02M 3/33569
2018/0226895 A1 * 8/2018 Song ....................... H02M 1/34

* cited by examiner

*Primary Examiner* — Thienvu V Tran
*Assistant Examiner* — Carlos O Rivera-Perez
(74) *Attorney, Agent, or Firm* — Derek J. Westberg, Esq.

(57) ABSTRACT

A switching power supply comprises a power converter having a transformer, a low side switch configured to draw current from a supply voltage through a primary winding of the transformer and a high side switch configured to couple the primary winding of the transformer to a snubber capacitor. A controller is configured to synchronously control the opening and closing of the low side switch and the high side switch so as to form a regulated output voltage. A first voltage is generated at a node between the low side switch and the high side switch. The controller is further configured to open the high side switch during each switching cycle when the first voltage reaches a determined level. The determined level is higher than the supply voltage by an amount that is adjusted dependent on a monitored level of the supply voltage.

30 Claims, 7 Drawing Sheets

(51) Int. Cl.
  *H02M 1/34*     (2007.01)
  *H02M 1/00*     (2006.01)
  *H02M 3/00*     (2006.01)
(52) U.S. Cl.
  CPC ...... *H02M 3/33507* (2013.01); *H02M 1/0009* (2021.05); *H02M 1/346* (2021.05); *H02M 3/01* (2021.05)
(58) Field of Classification Search
  CPC ............ H02M 1/0025; H02M 1/0032; H02M 1/0035; H02M 1/0038; H02M 1/0048; H02M 1/0054; H02M 1/0058; H02M 1/0067; H02M 1/342–348; H02M 7/4815; H02M 7/4818; Y02B 70/10
  USPC ..... 363/15–21.18, 37, 40–43, 50, 56.12, 89, 363/95–98, 123, 131–134; 323/205–211, 323/222–226, 235, 271–277, 282–287, 323/299–303, 351
  See application file for complete search history.

SWITCHING POWER CONVERTER AND CONTROLLER FOR A SWITCHING POWER CONVERTER

This is a continuation of U.S. Ser. No. 16/438,435, filed Jun. 11, 2019, the entire contents of which are hereby incorporated by reference.

BACKGROUND OF THE INVENTION

The present invention relates to the field of switching power converters. More particularly, the present invention relates to a switching power converter and a controller for a switching power converter.

An off-line switching power supply receives power from an alternating-current (AC) power source and provides a voltage-regulated, direct-current (DC) output that can be used to power a load. An exemplary off-line power supply includes a power factor correction (PFC) stage and a DC-to-DC power converter stage. The PFC stage receives the AC input signal, performs rectification and maintains current drawn from the AC source substantially in phase with the AC voltage so that the power supply appears as a resistive load to the AC source. The DC-to-DC converter stage receives the rectified output of the PFC stage and generates the voltage-regulated, DC output that can be used to power the load. A voltage rectifier, such as a full-bridge rectifier, and a smoothing capacitor can be used in place of the PFC stage, in which case, the DC-to-DC stage can receive a rectified voltage from the voltage rectifier as its input. In either case, the input to the DC-to-DC stage is typically at higher voltage and is more loosely regulated than the output of the DC-to-DC stage.

A flyback power converter (or, more simply, a flyback converter) can be employed in a DC-to-DC power converter. A flyback converter employs a transformer that transfers energy from the input of the flyback converter to its output and provides electrical isolation between the input and output of the flyback converter. An input voltage, such as the rectified output voltage of a PFC stage, is applied across the transformer primary winding by closing a switch; as a result, a primary winding current flows and magnetic flux in the transformer increases, storing energy in the transformer. When the switch is opened, the voltage is removed and the primary winding current falls while magnetic flux drops. As a result, a current is induced in a secondary winding of the transformer. This induced current charges an output capacitor to generate an output voltage for powering a load.

Switching power supplies can be subjected to a variety of input voltage and loading conditions. It is important for such power supplies to operate efficiently so as to minimize power usage. Therefore, what are needed are improved techniques for a switching power supply that accommodate different operating conditions and that achieve efficient operation. What are further needed are such techniques for a switching power supply that employs a flyback power converter.

SUMMARY OF THE INVENTION

In accordance with an embodiment, a switching power supply comprises a power converter having a transformer, a low side switch configured to draw current from a supply voltage through a primary winding of the transformer and a high side switch configured to couple the primary winding of the transformer to a snubber capacitor. A controller is configured to synchronously control the opening and closing of the low side switch and the high side switch, wherein the low side switch and the high side switch are each repeatedly opened and closed in a series of switching cycles so as to form a regulated output voltage. A first voltage is generated at a node between the low side switch and the high side switch. The controller is further configured to open the high side switch during each switching cycle when the first voltage reaches a determined level. The determined level is higher than the supply voltage by an amount that is adjusted dependent on a monitored level of the supply voltage.

These and other embodiments are disclosed herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

The present invention is directed toward a power converter and controller for a switching power supply and manner of operation thereof. The converter can be, for example, a flyback power converter employed in an offline switching power supply. In accordance with an embodiment of the present invention, the power converter employs two synchronously-operated transistor switches on the transformer primary side. A first of the transistor switches couples the transformer primary winding to a ground node and is referred to herein as the "low side" switch. A second of the two transistor switches couples the transformer primary winding to an input supply voltage via a snubber capacitor and is referred to herein as the "high side" switch. Switching is controlled in a feedback loop to generate a regulated DC output voltage at the transformer secondary side. In accordance with an embodiment of the present invention, a time instant of opening the high side switch within each switching cycle is adjusted according to a level of the input supply voltage.

In accordance with a further embodiment, a controller for a switching power supply is provided. The controller is configured to control a power converter having a transformer, a low side switch and a high side switch. The low side switch draws current from an input supply voltage through a primary winding of the transformer. The high side switch discharges current from the primary winding of the transformer to a snubber capacitor. The controller synchronously controls the opening and closing of the low side switch and the high side switch to generate a regulated output voltage. The controller is further configured to adjust a time instant of opening the high side switch within each switching cycle according to a level of the input supply voltage.

Embodiments of the present invention can be employed in power converter systems and methods disclosed in U.S. Pat. Nos. 9,716,437 and 10,103,637, the entire contents of each of which are hereby incorporated by reference.

The term "continuous conduction mode" or "CCM" means that current in the primary winding of the transformer of a power converter flows continuously throughout successive switching cycles. The term "discontinuous conduction mode" or "DCM" means that the current in the primary winding of the transformer is allowed to fall to zero for a period of time (i.e. "dead" time) during each switching cycle. The term "critical conduction mode" or "CRM" refers to operation at or near the boundary between CCM and DCM operating modes. In other words, during CRM, the current in the primary winding to allowed to fall to zero just before the current rises again.

Operation in CRM is useful during high loading conditions in order to achieve high efficiency. When loading is reduced, however, the level of current in the primary winding that is required to maintain a regulated output voltage is also reduced. As a result, operation at lower loading levels tends to revert to DCM. The level of the input voltage can also affect operation. For example, when the input voltage is higher, the "dead" time duration in DCM tends to increase, whereas, when the input voltage is lower, the "dead" time duration in DCM tends to decrease. Input voltage levels can vary based on the level of the AC line voltage. For example, different countries have adopted different AC line voltage levels as their respective standards. Loading can also affect the input voltage level; for example, increased current draw from an AC source can reduce its voltage level.

Due in part to the "dead" time, operation in DCM tends to be less efficient than other modes of operation. According to an embodiment of the present invention, a time instant of opening the high side switch is adjusted within each switching cycle according to a level of the input supply voltage. More particularly, when the input voltage is reduced, the high side switch can be opened earlier in the switching cycle than otherwise would be the case. Conversely, when the input voltage is increased, the high side switch can be opened later in the switching cycle than otherwise would be the case. As a result, the "dead" time duration within a switching cycle is reduced. This tends to increase efficiency.

In an embodiment, the time instant of opening the high side switch is adjusted continuously based on a monitored level of the input voltage. The input voltage level can be monitored, for example, by sampling the input voltage at an appropriate time during each switching cycle. For example, the input voltage can be sampled a predetermined delay after the high side switch is opened during each switching cycle. The level of the input voltage can fluctuate during switching cycles. By sampling the input voltage at the same instant during each switching cycle, sampling error caused by these fluctuations is reduced.

The increase in efficiency obtained by opening the high side earlier in the switching cycle when the input voltage is lower tends to be more pronounced at higher loading conditions. Therefore, in accordance with further embodiment of the present invention, the above-described adjusting of the time instant of opening the high side switch can be disabled when loading conditions are light. This can be accomplished, for example, by monitoring an output voltage of the power converter. When the output voltage falls below a threshold, this indicates a light loading condition, and the adjusting of the time instant of opening the high side switch can be disabled. When the output voltage rises above the threshold, this indicates that the light loading condition has ended, and the adjusting of the time instant of opening the high side switch can be enabled.

Figure 1:
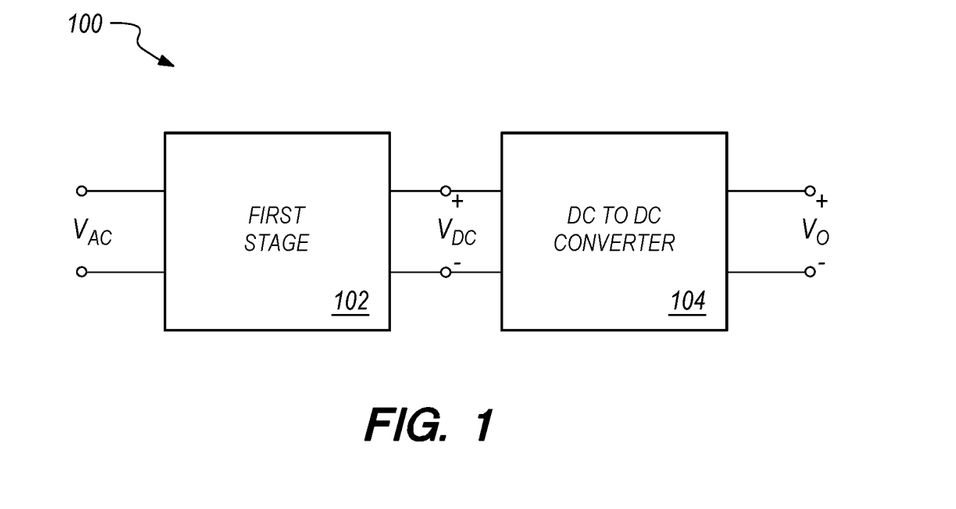
FIG. 1 illustrates a block schematic diagram of a two-stage, off-line power supply in accordance with an embodiment of the present invention.

FIG. 1 illustrates a block schematic diagram of a two-stage, off-line power supply 100 in accordance with an embodiment of the present invention. As shown in FIG. 1, a first stage 102 has an input coupled to alternating-current (AC) source. The first stage 102 performs rectification on the AC input signal. The first stage 102 can also perform power factor correction (PFC), in which case, the first stage 102 also maintains current drawn from the AC source substantially in phase with the AC voltage so that the power supply 100 appears as a resistive load to the AC source.

The first stage 102 generates a loosely regulated voltage, $V_{DC}$, which is provided as input to a DC-to-DC converter 104. Using the input supply voltage $V_{DC}$, the DC-to-DC converter stage 104 generates a voltage-regulated, DC output, $V_O$, which can be used to power a load. The level of $V_O$ is preferably at a higher voltage and is more loosely regulated than the output $V_O$ of the DC-to-DC converter stage 104. The nominal level of the output, $V_{DC}$, of the first stage 102 may be, for example, approximately 380 volts DC, while the voltage-regulated output $V_O$ of the DC-to-DC converter stage 104 may be, for example, approximately 15.0 volts DC.

Figure 2:
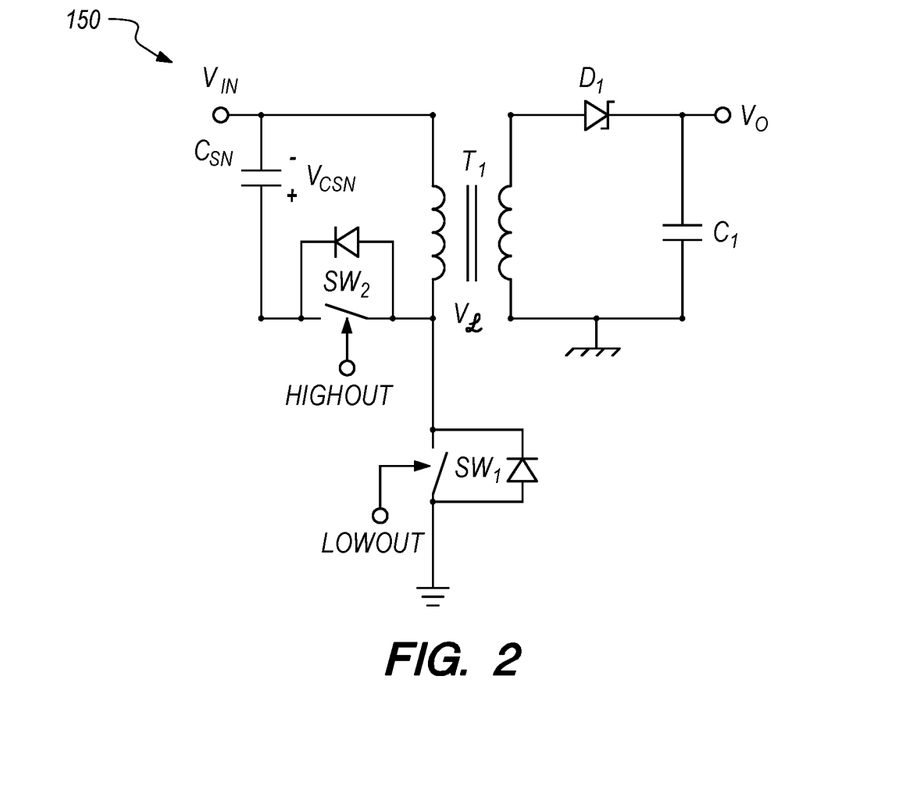
FIG. 2 illustrates a flyback converter suitable for use in a DC-to-DC converter in accordance with an embodiment of the present invention.

FIG. 2 illustrates a flyback converter 150 in accordance with an embodiment of the present invention. The flyback converter 150 is suitable for use in a DC-to-DC converter of a switching power supply, such as the DC-to-DC converter 104 of FIG. 1. The flyback converter 150 receives an input voltage from source VIN that can be a rectifier output or PFC stage output, $V_{DC}$, or that can be received from some other source, such as an electromagnetic interference (EMI) filter.

As shown in FIG. 2, the input voltage source VIN is coupled to a first terminal of a capacitor $C_{SN}$ and to a first terminal of a primary winding of a transformer $T_1$. The capacitor $C_{SN}$ functions as a snubber capacitor. A voltage $V_{CSN}$ having polarity as shown in FIG. 2 is formed across the capacitor $C_{SN}$. A second terminal of the primary winding of the transformer $T_1$ is coupled to a first terminal of a switch $SW_1$ ("low side" switch) and to a first terminal of a switch $SW_2$ ("high side" switch). A voltage V is formed at a node between the low side switch $SW_1$ and the high side switch $SW_2$ and at the second terminal of the primary winding of the transformer $T_1$. A second terminal of the switch $SW_1$ is coupled to a first ground node. A second terminal of the switch $SW_2$ is coupled to a second terminal of the capacitor $C_{SN}$. The switch $SW_1$ is controlled by a signal LOWOUT while the switch $SW_2$ is controlled by a signal HIGHOUT.

The low side switch $SW_1$ and the high side switch $SW_2$ are each preferably implemented by a corresponding power MOSFET. Thus, a body diode is shown associated with each of switches $SW_1$ and $SW_2$.

A first terminal of a secondary winding of the transformer $T_1$ is coupled to an anode of a Zener diode $D_1$. A cathode of the diode $D_1$ is coupled to a first terminal of a capacitor $C_1$. A second terminal of the secondary winding of the transformer T1 is coupled to a second terminal of the capacitor $C_1$ and to a second ground node. The first and second ground nodes are preferably electrically isolated from each other.

The flyback converter 150 is operated by opening and closing the switches $SW_1$ and $SW_2$. The transformer $T_1$ transfers energy from the input of the flyback converter 150 to its output and provides isolation between the input and output of the flyback converter 150. In operation, when the switch $SW_1$ is closed (the switch is turned "ON"), voltage source $V_{IN}$ is applied across the primary winding of the transformer $T_1$. As a result, a current in the primary winding and a magnetic flux in the transformer $T_1$ increases, which stores energy in the transformer $T_1$. When the switch $SW_1$ is then opened (the switch is turned "OFF"), the current in the primary winding and the magnetic flux drops. As a result, a current is induced in the secondary winding of the transformer $T_1$ that charges the capacitor $C_1$ with energy to generate an output voltage $V_O$ for powering a load.

The level of power transferred to the load can be controlled by adjusting the switching duty cycle of the switch $SW_1$ (e.g., by controlling peak input current), the switching frequency of the switch $SW_1$, or both. Controlling the duty cycle is referred herein to as peak current control, whereas, controlling the switching frequency is referred to herein as frequency control.

When the switch $SW_1$ is opened and the switch $SW_2$ is in the closed position (the switch $SW_2$ is "ON"), the current in the primary winding of the transformer $T_1$ can pass through the switch $SW_2$ to the snubber capacitor $C_{SN}$. Alternatively, when the switch $SW_1$ is opened and the switch $SW_2$ is in the open position (the switch $SW_2$ is "OFF"), the current in the primary winding of the transformer $T_1$ can pass through the body diode of the switch $SW_2$ to the snubber capacitor $C_{SN}$.

The high side switch $SW_2$ is preferably controlled such that it is open (OFF) when the low side switch $SW_1$ is closed (ON). Then, when the switch $SW_1$ is opened (OFF) and the energy from the transformer $T_1$ has been largely discharged to the output capacitor $C_1$, the voltage $V_{\mathcal{S}}$ will be equal to $V_{CSN}$. Under these conditions, the switch $SW_2$ is briefly closed (ON). The switch $SW_2$ can, therefore, be operated under zero volt switching (ZVS) conditions. Closing the switch $SW_2$ discharges the level of $V_{\mathcal{S}}$, to that of $V_{IN}$. Then, once $V_{\mathcal{S}}$ is substantially equal to $V_{IN}$, the switch $SW_2$ can be opened (OFF). The voltage $V_{\mathcal{S}}$ continues to fall after the switch $SW_2$ is opened, such that when the switch $SW_1$ is closed, the voltage across it is zero or nearly zero. Thus, the switch $SW_1$ can also be operated under zero volt switching (ZVS) conditions. The cycle then repeats.

To summarize, during a switching cycle, the low side switch $SW_1$ is turned off; then the high side switch $SW_2$ is turned on and then off immediately before the low side switch $SW_1$ is turned on. The cycle is then repeated (i.e. $SW_1$—off, $SW_2$—on, $SW_2$—off, $SW_1$—on, $SW_1$ —off, . . . ). The high side switch $SW_2$ is thus turned on then off once before each low side switch $SW_1$ turn on. Also, the high side switch $SW_2$ is turned on then off once for each cycle of the low side switch $SW_1$ (while the low side switch $SW_1$ is off). In other words, each switch is turned on and then off while the other switch is off.

In an embodiment, both switches $SW_1$ and $SW_2$ are operated under ZVS, regardless of load. Thus, they can both be operated under ZVS from no load to full load. In other embodiments, the switches $SW_1$ and $SW_2$ are not operated under ZVS or are operated partially under ZVS. For example, in accordance with an embodiment of the present invention, the high side switch $SW_2$ is opened at a time instant that depends upon the level of $V_{IN}$. In this circumstance, the switch $SW_2$ may be opened under non-ZVS conditions because it is opened before the level of $V_{\mathcal{S}}$ is equal to $V_{IN}$.

The flyback converter 150 has a resonant switching frequency. The resonant frequency is dependent upon physical characteristics of the flyback converter 150, including the inductance value of the transformer $T_1$ primary winding and parasitic capacitance of the switches $SW_1$ and $SW_2$. When the switch $SW_2$ is closed, this introduces the capacitance of the snubber capacitor $C_{SN}$ and therefore effectively changes the resonant frequency of the flyback converter 150 while the switch $SW_2$ is closed.

The diode $D_1$ coupled to the transformer $T_1$ secondary winding operates as a freewheeling diode, allowing current in the secondary winding of the transformer $T_1$ to charge the capacitor $C_1$, and preventing discharge of the capacitor $C_1$ through the transformer $T_1$. The diode $D_1$ can be replaced with a switch that is operated synchronously with the switches $SW_1$ and $SW_2$ (synchronous rectification).

Figure 3:
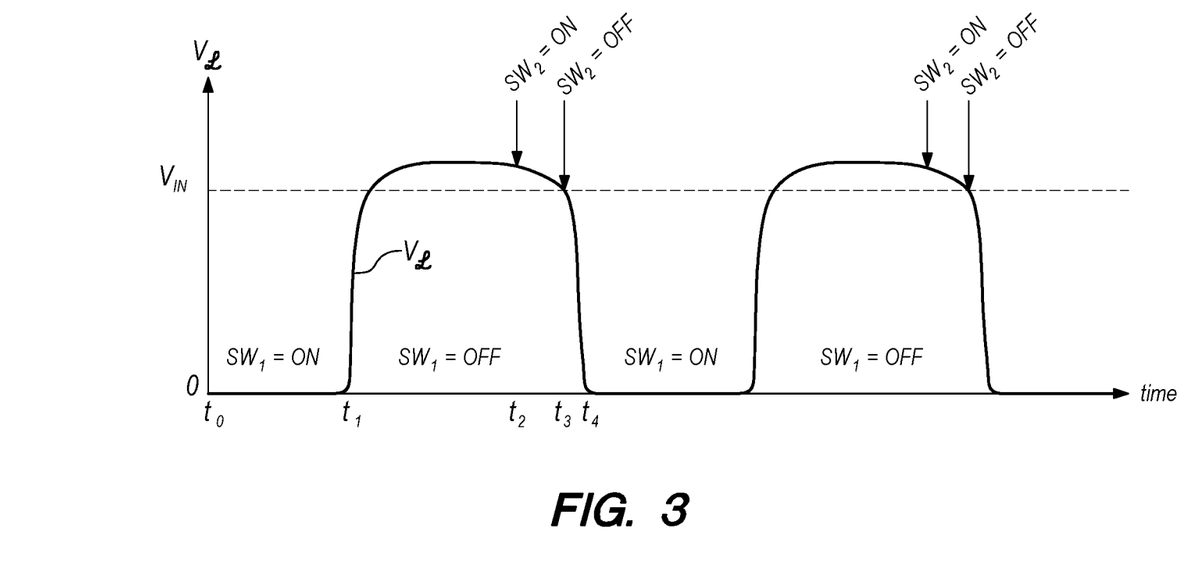
FIG. 3 illustrates a voltage waveform for a flyback converter in accordance with an embodiment of the present invention.

FIG. 3 shows a voltage waveform illustrating quasi-resonant operation of a flyback converter in accordance with an embodiment of the present invention. The waveform represents the level of $V_{\mathcal{S}}$ for two switching cycles. As shown in FIG. 3, the switch $SW_1$ is initially closed (ON) at time to so that the level of $V_{\mathcal{S}}$ is essentially zero volts. This causes current to flow in the primary winding of the transformer $T_1$ which charges the primary winding of the transformer $T_1$ with energy. The switch $SW_1$ is then opened (OFF) at time $t_1$. As a result, the level of $V_{\mathcal{S}}$ rapidly rises to a level above that of $V_{IN}$. Current then passes through the body diode of the switch $SW_2$ while energy from the transformer $T_1$ induces a current in the secondary winding of the transformer $T_1$ which charges the output capacitor $C_1$. Then, when the voltage $V_{\mathcal{S}}$ is equal to $V_{CSN}$, or nearly equal to $V_{CSN}$, the switch $SW_2$ is briefly closed (ON) at time $t_2$. This discharges the level of $V_{\mathcal{S}}$ towards that of $V_{IN}$. Then at time $t_3$ the switch $SW_2$ is opened (OFF). And at time $t_4$ the switch $SW_1$ is closed (ON). This causes the level of $V_{\mathcal{S}}$ to fall to zero volts while a current again flows in the primary winding of the transformer $T_1$ and the switching cycle repeats.

Because the voltage $V_{\mathcal{S}}$ is preferably equal to or nearly equal to $V_{CSN}$ when the switch $SW_2$ is closed, the switch $SW_2$ is can be closed under zero volt switching (ZVS) conditions. By controlling the high side switch $SW_2$ synchronously with ZVS, this provides for more efficient operation, for example, by avoiding losses caused by non-ZVS switching, and allows for operation at higher switching frequencies than otherwise which also tends to increase efficiency of the flyback converter.

The waveform shown in FIG. 3 assumes that the switch $SW_2$ is closed (ON) as soon as the voltage $V_{\mathcal{S}}$ first becomes equal to $V_{CSN}$, or nearly equal to $V_{CSN}$. This is referred to herein as "quasi-resonant" or "first hill" switching. If the closing of the switch $SW_2$ is delayed, the voltage $V_{\mathcal{S}}$ will tend to oscillate. Zero volt switching can be maintained under these conditions if the switch $SW_2$ is closed at a time when $V_{\mathcal{S}}$ is equal to or nearly equal to $V_{CSN}$ during oscillation of the voltage $V_{\mathcal{S}}$. This is referred to herein as "valley switching" and is shown in FIG. 4.

Figure 4:
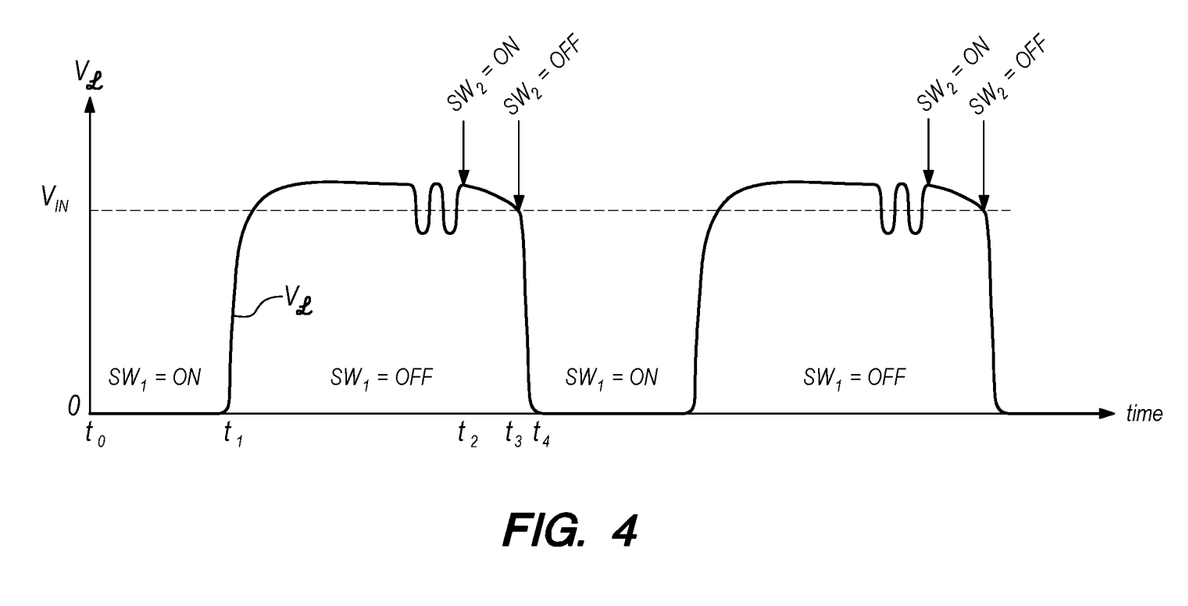
FIG. 4 illustrates a voltage waveform for a flyback converter in accordance with an embodiment of the present invention.

FIG. 4 shows a voltage waveform illustrating valley switching operation of a flyback converter in accordance with an embodiment of the present invention. The waveform of the voltage $V_{\mathcal{S}}$ shown in FIG. 4 is equivalent to that shown in FIG. 3 except that the voltage $V_{\mathcal{S}}$ oscillates prior to closing of the switch $SW_2$. FIG. 4 shows two oscillations occurring prior to the closing of switch $SW_2$ at time $t_2$. It will be apparent that greater or fewer oscillations can occur while maintaining zero volt switching so long as the switch $SW_2$ is closed at a time when $V_\mathscr{S}$ is equal to or nearly equal to $V_{CSN}$.

As shown in FIGS. 3 and 4, the high side switch $SW_2$ is closed at the time $t_2$ and opened at the time $t_3$. Therefore, the switch $SW_2$ remains closed during the time period between $t_2$ and $t_3$. The duration of the time period $t_2$-$t_3$ illustrated in FIG. 3 can represent the highest expected level of $V_{IN}$, for example, 380 volts DC. However, as explained herein, this time period can be adjusted based on the level of $V_{IN}$. For example, when $V_{IN}$ is lower than 380 volts DC (e.g., 240 volts DC), then the switch $SW_2$ can be opened sooner in the switching cycle thereby moving the time $t_3$ closer to $t_2$ and shortening the duration of the time period between $t_2$ and $t_3$.

The switch $SW_2$ is preferably closed under ZVS. The switch $SW_2$ may also be opened under ZVS. In the example above, the switch $SW_2$ is opened under ZVS when the supply voltage $V_{IN}$ is 380 volts DC, however, the switch $SW_2$ may be opened under non-ZVS conditions when the supply voltage $V_{IN}$ is lower and the time $t_3$ occurs sooner in the switching cycle. Doing so helps to improve efficiency by squeezing more energy from the snubber capacitor $C_{SN}$ (FIG. 2) under such conditions. The amount by which the time period $t_2$-$t_3$ is shortened is preferably proportional to the change in the level of $V_{IN}$.

The flyback converter 150 can selectively operate in accordance with quasi-resonant switching (as in FIG. 3) or valley switching (as in FIG. 4), depending upon conditions such as switching frequency, loading conditions, component values, and so forth, in order to regulate the output voltage.

Figure 5:
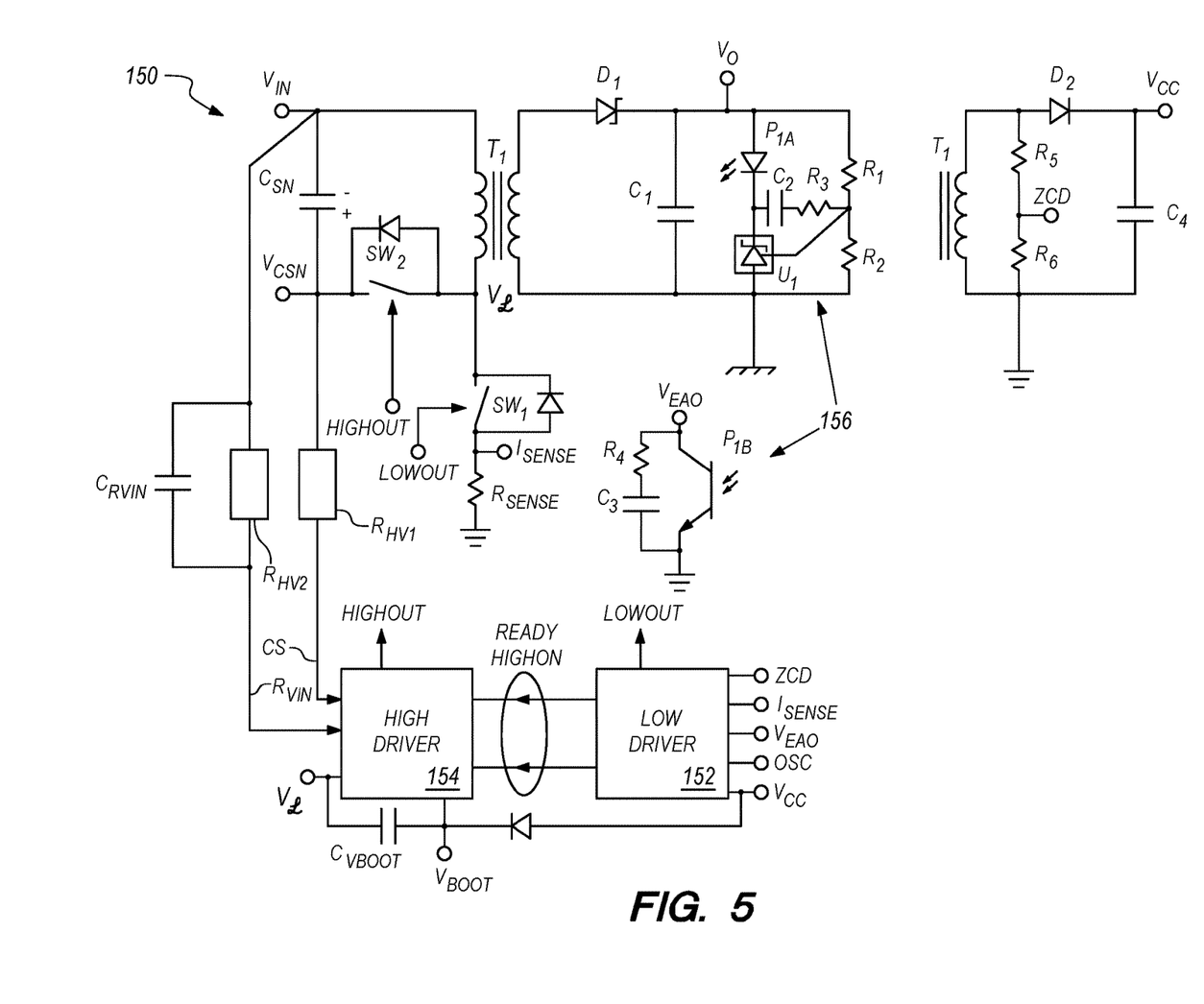
FIG. 5 illustrates a flyback converter and control circuitry in accordance with an embodiment of the present invention.

FIG. 5 illustrates a flyback converter 150 and control circuitry in accordance with an embodiment of the present invention. The flyback converter 150 of FIG. 2 is shown in FIG. 5 along with control circuitry and a second output stage. In particular, a "low driver" controller 152 generates a signal LOWOUT that controls (opens and closes) the switch $SW_1$. The low driver controller 152 can control the switch $SW_1$ using frequency control and/or peak current control in a feedback loop so as to regulate the output voltage $V_O$. A "high driver" controller 154 generates a signal HIGHOUT that controls (opens and closes) the switch $SW_2$. The flyback converter 150 and control circuitry of FIG. 5 are preferably configured to control the high side switch $SW_2$ and the low side switch $SW_1$ in accordance with the waveforms of FIGS. 3 and 4 and preferably configured adjust the instant of opening the high side switch $SW_2$ (i.e. the time $t_3$ as shown in FIGS. 3 and 4) based on the monitored level of $V_{IN}$, as described herein.

As shown in FIG. 5, a resistive divider and photo-couple network 156 is coupled to the flyback converter 150 output and includes resistors $R_1$, $R_2$, and $R_3$, capacitor $C_2$, photodiode PIA, and shunt regulator $U_1$. The photo-diode PIA is optically coupled to phototransistor $P_{IB}$. The phototransistor $P_{IB}$ is coupled to a compensation resistor $R_4$ and capacitor $C_3$. A voltage signal $V_{EAO}$ is generated across the compensation resistor $R_4$ and capacitor $C_3$. The signal $V_{EAO}$ is representative of an error signal (a difference between the level of $V_O$ and a desired level for $V_O$) and is also representative of a level of input power to the flyback converter 150. The signal $V_{EAO}$ is electrically isolated from the output voltage $V_O$ and is instead referenced to the ground level of the primary side of the transformer $T_1$.

The transformer $T_1$ can include a second secondary winding. As shown in FIG. 5, a first terminal of the second secondary winding of the transformer $T_1$ is coupled to an anode of a diode $D_2$. A cathode of the diode $D_2$ is coupled to a first terminal of a capacitor $C_4$. A second terminal of the second secondary winding of the transformer $T_1$ is coupled to a second terminal of the capacitor $C_4$ and to the first ground node. A voltage VCC is formed across the capacitor $C_4$ and can be used for powering control circuitry of the flyback converter 150. A resistive divider includes resistors $R_5$ and $R_6$ and generates a voltage signal ZCD that is representative of the level of $V_{CC}$. The signal ZCD is also representative of the level of $V_\mathscr{S}$.

As also shown in FIG. 5, a current sensing resistor RSENSE is coupled between the second terminal of the transistor switch $SW_1$ and the first ground node. A current sensing signal $I_{SENSE}$ is formed across the resistor $R_{SENSE}$.

The low driver controller 152 receives as inputs the signals ZCD, $I_{SENSE}$, $V_{EAO}$ as well as an oscillator signal OSC and uses these signals to generate the signal LOWOUT for controlling the transistor switch $SW_1$ as explained herein. The signal $V_{EAO}$ represents the load power and is used to regulate the output voltage in a feedback loop based on either peak current control or switching frequency control. The signal $I_{SENSE}$ represents the current in the transformer $T_1$ and is used to the control peak current in the transformer primary winding during switching. The oscillator signal OSC is used for controlling the timing of switching. The signal ZCD is representative of the level of $V_\mathscr{S}$ and is used to turn on the switch $SW_1$.

The low driver controller 152 generates a differential signal READYHIGHON which is used by the high driver controller 154 for controlling the transistor switch $SW_2$ as explained herein. The signal READYHIGHON informs the high driver controller 154 that it can (i.e. has permission to) turn on the switch $SW_2$, though the high driver controller 154 determines the timing of turning on the switch $SW_2$. The signal READYHIGHON is preferably a differential signal because the low driver controller 152 and the high driver controller 154 have different ground reference nodes. In particular, the low driver controller 152 is referenced to the first ground node, whereas, the high driver controller 154 preferably uses the voltage $V_\mathscr{S}$ as its reference.

As also shown in FIG. 5, a first terminal of a first high-voltage resistor $R_{HV1}$ is coupled to the second terminal of the capacitor $C_{SN}$. A second terminal of the resistor $R_{HV1}$ is coupled to the high driver controller 154. This provides the high driver controller 154 with a signal CS that is representative of the voltage $V_{CSN}$. A first terminal of a second high-voltage resistor $R_{HV2}$ is coupled to the input voltage $V_{IN}$. A second terminal of the resistor $R_{HV2}$ is coupled to the high driver controller 154. A capacitor $C_{RVIN}$ is preferably coupled in parallel with the resistor $R_{HV2}$. This provides the high driver controller 154 with a signal $R_{VIN}$ that is representative of the voltage $V_{IN}$. The capacitor $C_{RVIN}$ helps in smoothing the signal $R_{VIN}$ particularly at light loads. The voltage $V_\mathscr{S}$ signal is also coupled to the high driver controller 154. The high driver controller 154 uses the signals $R_{VIN}$, CS, $V_\mathscr{S}$, and READYHIGHOUT to generate the signal HIGHOUT that controls (opens and closes) the switch $SW_2$ as explained herein. Briefly, when $V_\mathscr{S}$ is greater than $V_{IN}$ and CS is substantially equal to $V_\mathscr{S}$, the high driver controller 154 turns on the switch $SW_2$. The switch $SW_2$ generally stays on until $V_\mathscr{S}$ is substantially equal to $V_{IN}$ and then the switch $SW_2$ is turned off though, as explained herein, the time instant at which the switch $SW_2$ is turned off can also be dependent upon the level of the input voltage $V_{IN}$.

Also shown in FIG. 5, the voltage $V_{CC}$ can be used as a power supply for powering elements of the low driver controller 152. A voltage $V_{BOOT}$ can be used as a power supply for powering elements of the high driver controller 154. The voltage $V_{BOOT}$ can be obtained by drawing current from $V_{CC}$, for example, via a diode which then charges a capacitor $C_{VBOOT}$. The voltage $V_{BOOT}$ can also be used to indicate a level of loading of the power converter 150 as explained herein.

A switching cycle is performed as follows. The low side switch $SW_1$ is turned on. Then, once the peak current in the primary winding of the transformer $T_1$ is reached, as indicated by the current sensing signal $I_{SENSE}$, the low side switch $SW_1$ is turned off. The peak current depends on the level of $V_{EAO}$: (1) when $V_{EAO}$ is less than a threshold (e.g. 2.5 volts), then the flyback converter is in frequency control mode and the peak current is essentially a fixed value (though the peak current is preferably gradually reduced as $V_{EAO}$ falls in order to increase efficiency and inhibit audible noise in burst mode); (2) when $V_{EAO}$ is greater than the threshold (e.g. 2.5 volts), then the flyback converter is in current control mode and the peak current depends on $V_{EAO}$ (and the switching frequency is clamped). Once the low side switch $SW_1$ turns off, the voltage Vs flies up, eventually reaching a level above the input voltage $V_{IN}$. The low side driver 152 then activates sending the READYHIGHON signal to the high side driver 154. The READYHIGHON signal is activated at a time that depends upon the switching frequency. After receiving the READYHIGHON signal, the high side driver 154 determines that $V_s$ is greater than $V_{IN}$ by an appropriate margin and, in response to this determination, the high side driver 154 turns on the high side switch $SW_2$. The high side switch $SW_2$ remains on until the level of $V_s$ falls to the level of $V_{IN}$, at which time, high side driver 154 turns off the high side switch $SW_2$. The time instant at which the high side driver 154 turns off the high side switch $SW_2$ can also be adjusted according to a level of $V_{IN}$ as explained herein. More particularly, the high side switch $SW_2$ can be opened before $V_s$ falls to the level of $V_{IN}$ by an amount that depends on the level of $V_{IN}$. When the level of $V_s$ falls to zero, the low side switch $SW_1$ can be turned on again.

The waveforms of FIGS. 3 and 4 apply equally to the current control and frequency control modes, though the time scale will change, dependent upon the mode of operation.

Figure 6:
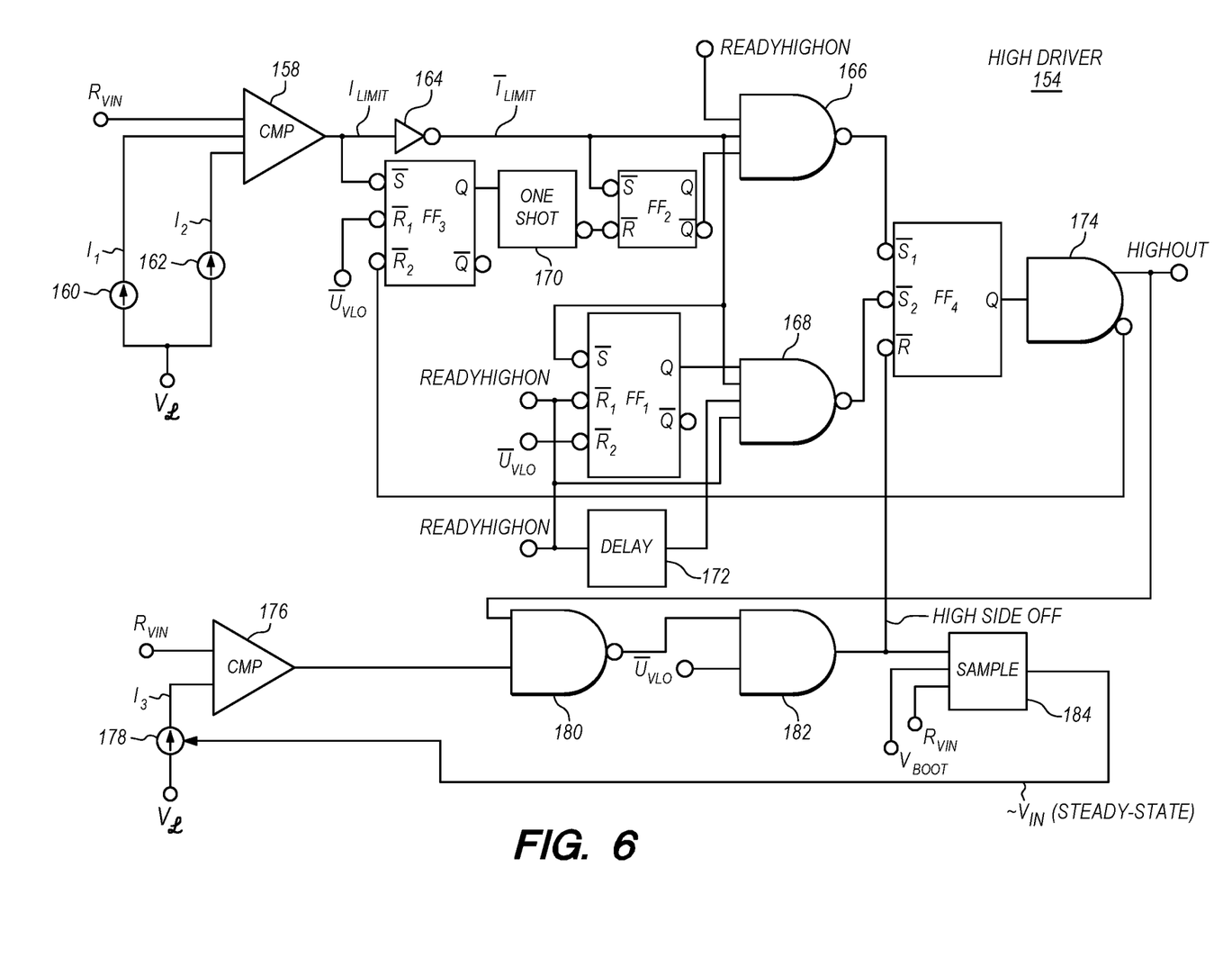
FIG. 6 illustrates control circuitry for a flyback converter in accordance with an embodiment of the present invention.

FIG. 6 illustrates control circuitry of the high driver 154 in accordance with an embodiment of the present invention. A signal $R_{VIN}$, which represents the input supply voltage $V_{IN}$, is compared by a comparator 158 to a pair of reference currents $I_1$ and $I_2$ which are generated by current sources 160 and 162, respectively. The current sources 160 and 162 are coupled to $V_s$ as a reference voltage. In an embodiment, the current $I_1$ is set to 2 µA (2 microamps) while the current $I_2$ is set to 60 µA (60 microamps). The signals at the input of the comparator 158 may additionally be adjusted, for example, in order to compensate for signal path delays during high-frequency operation.

The output of the comparator 158 is logic signal $I_{LIMIT}$. $I_{LIMIT}$ is a first logic level when the level of current received by the comparator 158 from $R_{VIN}$ is between the levels of $I_1$ and $I_2$ and, otherwise, $I_{LIMIT}$ is a second logic level. The signal $I_{LIMIT}$ is used to control the timing of turning on the high side switch $SW_2$. More particularly, the $R_{VIN}$ current level must be between the levels of $I_1$ and $I_2$ in order for the high side switch $SW_2$ to be turned on during a switching cycle (and the signal READYHIGHON must be activated). The comparator 158 is therefore a window comparator whose output indicates whether or not the $R_{VIN}$ current signal is between the levels of $I_1$ and 12. The comparator 158 determines that V is greater than $V_{IN}$ by an appropriate margin and, in response to this determination, the high side driver 154 turns on the high side switch $SW_2$. Thus, the window of comparison implemented by comparator 158 determines the timing for turning on $SW_2$ (shown at time $t_2$ in FIGS. 3 and 4). Providing a window for comparison helps to counter effects of noise associated with high rates of signal change and accommodates parasitic capacitance of the $R_{VIN}$ resistor RVH2 (FIG. 2) and avoids changing the logic level of $I_{LIMIT}$ at the moments when $V_{IN}$ and $V_s$ are crossing each other (when one is rising and the other is falling and vice-versa).

The output of the comparator 158 is inverted by an inverter 164 to form a logic signal $I_{LIMIT}$-bar. The signal $I_{LIMIT}$-bar is coupled to an input of a NAND gate 166, to an inverted set input S-bar of a flip-flop $FF_1$, to an input of a NAND gate 168 and to an inverted set input S-bar of a flip-flop $FF_2$. The signal $I_{LIMIT}$ is coupled to an inverted set input S-bar to a flip-flop $FF_3$. An output Q of the flip-flip $FF_3$ is coupled to an input of a one-shot circuit 170. An inverted output of the one-shot circuit 170 is coupled to an inverted reset input R-bar to the flip-flip $FF_2$. An inverted output Q-bar of the flip-flop $FF_2$ is coupled to an input of the NAND gate 166.

The signal READYHIGHON is coupled to an input of the NAND gate 166, to a first inverted reset input $R_1$-bar to the flip-flop $FF_1$, to an input of a delay 172 and to an input of the NAND gate 168. An inverted under-voltage lockout signal $U_{VLO}$-bar is coupled to a first inverted reset input $R_1$-bar to the flip-flop $FF_3$ and to second inverted reset input $R_s$-bar to the flip-flop $FF_1$. An output Q of the flip-flop $FF_1$ is coupled to an input of the NAND gate 168. An output of the delay 168 is coupled to an input of the NAND gate 168.

An output of the NAND gate 166 is coupled to a first inverted set input $S_1$-bar of a flip-flop $FF_4$. An output of the NAND gate 168 is coupled to a second inverted set input $S_2$-bar of the flip-flop $FF_4$. An output Q of the flip-flop $FF_4$ is coupled to an input of an AND gate 174. An inverted output of the gate 174 is coupled to a second inverted reset input to the flip-flop $FF_3$. A non-inverted output of the gate 174 forms the signal HIGHOUT. The generated signal HIGHOUT is used to control the switch $SW_2$.

The signal $R_{VIN}$ is also compared by a comparator 176 to a current $I_3$. The current $I_3$ is generated by an adjustable current source 178. The current source 178 is coupled to $V_s$ as a reference voltage. The current $I_3$ is adjusted based on the level of $V_{IN}$. The output of the comparator 176 is coupled to a first input of a NAND gate 180. The signal HIGHOUT is coupled to a second input to the NAND gate 180. An output of the NAND gate 180 is coupled to a first input of a NAND gate 182. The inverted under-voltage lockout signal $U_{VLO}$-bar is coupled to a second input of the NAND gate 182. An output of the NAND gate 182 is coupled to an inverted reset input R-bar to the flip-flop $FF_4$ and to a first input to a sample circuit 184.

The signal $R_{VIN}$ is coupled to a second input of the sample circuit 184. The NAND gate 182 generates a signal High Side Off, which is used by the sample circuit 184 for sampling $V_{IN}$. More particularly, each time that the high side switch $SW_2$ is turned off (i.e. opened), the sample circuit preferably waits a delay period of approximately 250 to 300 nanoseconds and then samples the level of $V_{IN}$. Therefore, the samples are taken at approximately when V is equal to zero volts. Successive samples of $V_{IN}$ can be averaged to ensure that the monitored level of $V_{IN}$ does not change rapidly. The sample circuit 184 generates a signal $\sim V_{IN}$ (steady-state) which is representative of the level of $V_{IN}$.

This signal is used for generating the current $I_3$ which is also representative of the level of $V_{IN}$.

Elements of FIG. 6 detect occurrence of the "first hill" for performing quasi-resonant switching as shown in FIG. 3. The signal READYHIGHON informs the high driver controller 154 that it can (i.e. has permission to) turn on the switch $SW_2$. The high driver controller 154 then determines the timing of turning on the switch $SW_2$: when Vs is greater than $V_{IN}$ (as indicated by the signal $I_{LIMIT}$) the high driver controller 154 turns on the switch $SW_2$.

The flip-flop $FF_1$ and the delay block 172 are used to delay turning on the switch $SW_2$ so as to avoid turning on the switch prematurely. The UvLo signal inhibits switching in case of an under-voltage condition.

The switch $SW_2$ stays on until the switch $SW_2$ is turned off based on comparison performed by comparator 176. More particularly, the switch $SW_2$ is turned off (opened) when $V_{IN}$ is substantially equal to $V_s$ as offset by an amount indicated by the level of $\sim V_{IN}$ (steady-state). The comparator 176 preferably performs its comparison with hysteresis so as to avoid multiple changes in the level of its output at crossings of the input signal levels of the comparator 176.

As shown in FIG. 6, the voltage supply VBOOT may be coupled to a third input to the sample circuit 184. This can be used for determining whether the power converter 150 is under light or heavy loading conditions. For example, VBOOT may be regulated to approximately 15 volts DC. When VBOOT rises above a threshold level of 15 volts, this indicates light loading. Conversely, when VBOOT falls below the threshold level of 15 volts, this indicates that the loading is no longer light. In accordance with an embodiment of the present invention, when the converter 150 is under light loading conditions, the function of turning off the switch $SW_2$ based on the level of $V_{IN}$ can be disabled. More particularly, when the level of VBOOT is above the threshold, the adjustment to the current $I_3$ based on the level of $\sim V_{IN}$ (steady-state) can be made equal to zero. When this occurs, the comparator 176 can compare the level of $V_{IN}$ (as represented by $R_{VIN}$) to the level of $V_s$ in order to determine when to open the switch $SW_2$. Under these conditions, the switch $SW_2$ can be opened under ZVS. Additionally, when the level of $V_{IN}$ is at a maximum threshold (e.g. 380 volts DC), the adjustment to the current $I_3$ based on the level of $\sim V_{IN}$ (steady-state) can also be equal to zero. However, when the level of $V_{BOOT}$ is above the threshold (and the level of $V_{IN}$ is below its maximum threshold), the level of the current $I_3$ can be representative of the level of $V_{IN}$ so that the switch $SW_2$ is opened based in part on the monitored level of $V_{IN}$ (i.e. $\sim V_{IN}$ (steady-state)).

Figure 7:
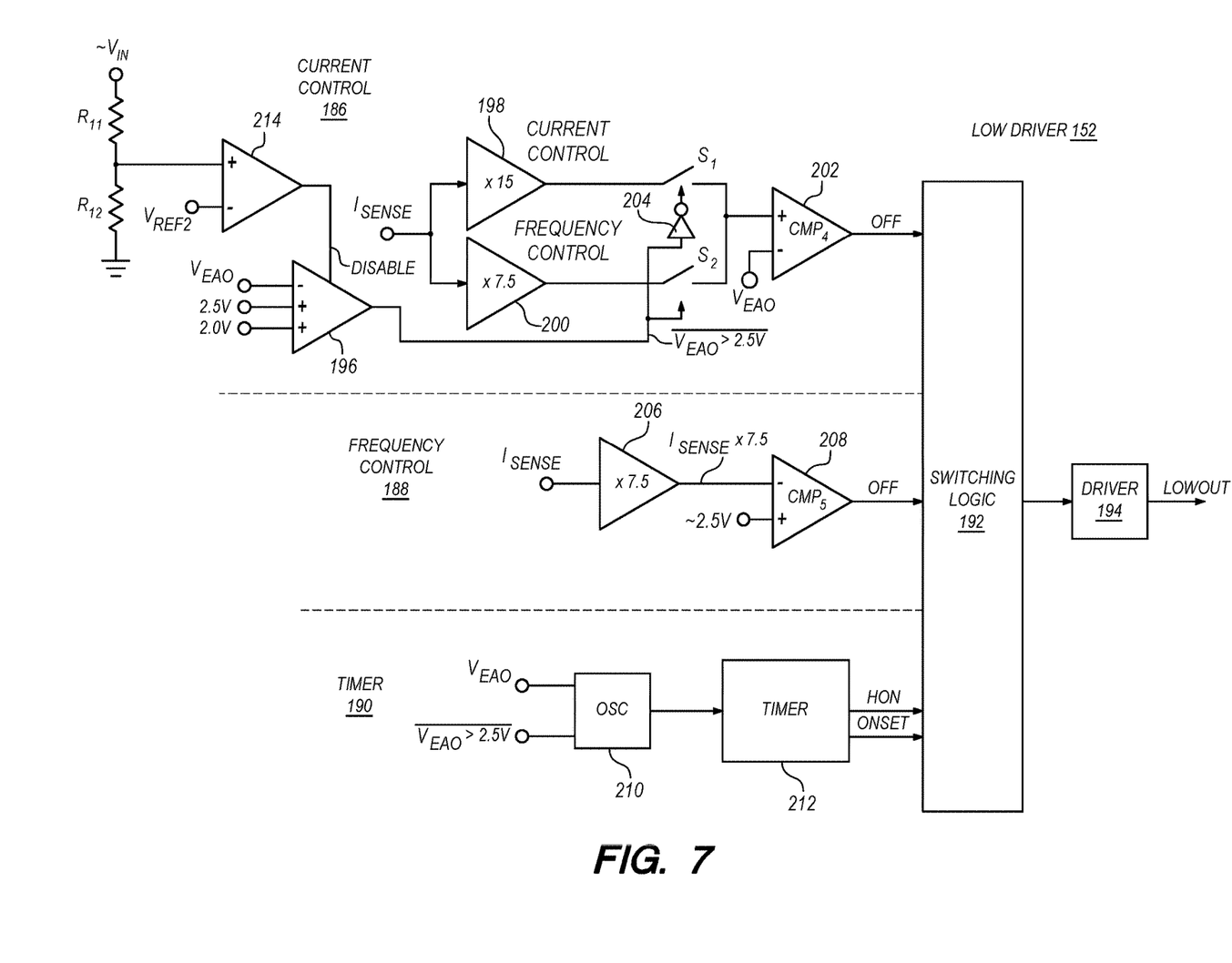
FIG. 7 illustrates additional control circuitry for a flyback converter in accordance with an embodiment of the present invention.
Figure 8:
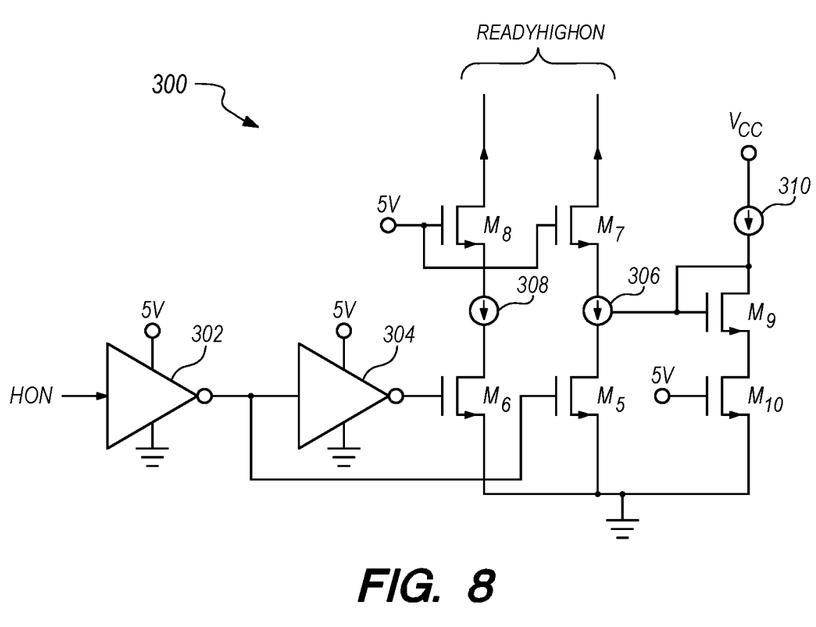
FIG. 8 illustrates a differential signal converter for use in control circuitry for a flyback converter in accordance with an embodiment of the present invention.

FIG. 7 illustrates control circuitry of the low driver 152 in accordance with an embodiment of the present invention. As shown in FIG. 8, the low driver 152 includes a current control section 186, a frequency control section 188, a timer section 190, switching logic 192 and a switch driver 194.

Within the current control section 186 of the low driver 152, the signal $V_{EAO}$ is coupled to a first input to a comparator 196. A second input to the comparator 196 receives a first reference voltage (e.g. 2.5 volts) while a third input to the comparator 196 receives a second reference voltage (e.g. 2.0 volts). The comparator 196 generates a signal "$V_{EAO}$ >2.5v-bar" by comparing the signal $V_{EAO}$ to the first and second reference voltages; the signal "$V_{EAO}$ >2.5v-bar" is activated when $V_{EAO}$ rises above the first reference and is deactivated when the signal $V_{EAO}$ falls below the second reference.

Thus, the comparator 196 performs its comparison with hysteresis. The comparator 196 determines whether low driver controller 154 performs switching based on peak current control or based on frequency control. When $V_{EAO}$ rises above 2.5 volts, switching is by peak current control; when $V_{EAO}$ falls below 2.0 volts, switching is by frequency control. Thus, the logic level of "$V_{EAO}$ >2.5v-bar" determines whether the switching is based on peak current control or frequency control.

The signal $I_{SENSE}$ is coupled an input to a first amplifier 198 and to an input to a second amplifier 200. The amplifier 1982 can have, for example, a gain of 15, while the amplifier 200 can have a gain of, for example 7.5. The output of the amplifier 198 is coupled to a first input to a comparator 202 via a switch $S_1$. The output of the amplifier 200 is coupled to the first input of the comparator via a switch $S_2$. The signal $V_{EAO}$ is coupled to a second input to the comparator CMP4. The signal "$V_{EAO}$ >2.5v-bar" is coupled to control the switch $S_2$ and to control the switch $S_1$ via an inverter 204. Thus, one of the switches $S_1$ are $S_2$ is closed while the other is opened dependent upon the signal "$V_{EAO}$ >2.5v-bar". Accordingly, the outputs of the amplifiers 198 and 200 are selectively coupled to the first input of a comparator 202 dependent upon the level of $V_{EAO}$. An output of the comparator 202 is coupled to an input to switching logic 192.

Under current control, the amplifier 198 having higher gain is active so as to magnify the effect of $I_{SENSE}$ in comparison to $V_{EAO}$ by comparator 202. Under frequency control, the amplifier 200 is active which employs lower gain so as to reduce the effect of $I_{SENSE}$ in the comparison which causes the frequency control section 188 to primarily control switching.

Within the frequency control section 188 of the low driver 152, the signal $I_{SENSE}$ is coupled to an input to an amplifier 206. The amplifier 206 can have, for example, a gain of 7.5. An output of the amplifier 206 is coupled to a first input to a comparator 208. A second input to the comparator is coupled to a reference voltage, which can be, for example, approximately 2.5 volts. An output of the comparator 208 is coupled to an input to switching logic 178.

The current control section 186 and the frequency control section 188 control the timing of turning off the low side switch $SW_1$ within each switching cycle via switching logic 192.

The timer section 190 of the low driver 152 controls switching frequency as well as the timing for turning on the low side switch $SW_1$ for each switching cycle. Within the timer section 190, the signal $V_{EAO}$ is coupled to a first input to an oscillator 210. The signal "$V_{EAO}$ >2.5v-bar" from the comparator 196 is coupled to a second input of the oscillator 210. The oscillator 210 generates a periodic ramp signal that is coupled to an input of timer block 212.

The timer block 212 generates a logic signal HON and a logic signal ONSET which are coupled to the switching logic 192. The signal HON is used to generate the signal READYHIGHON for the high driver controller 154. For peak current control, the signal HON is generated at fixed intervals. The signal ONSET is used to turn on the low side switch $SW_1$. For example, a timer of 3.33 microseconds can be reset for each switching cycle; 500 nanoseconds prior to expiration of the timer, the signal HON is activated. And, upon expiration of the timer, and once ZCD is greater than zero, then the signal ONSET can be activated. Once ONSET is activated, then the low side switch $SW_1$ can be closed upon a valley in signal ZCD (since ZCD represents $V_s$) so as to operate the switch $SW_1$ under zero volt switching (ZVS) conditions. The 500 nanosecond difference ensures that HON is activated prior to ONSET.

The signal ZCD is referenced to the same ground level as the low side driver controller 152. The signal ZCD is also representative of the level of Vr. Thus, signal ZCD is used by the low side driver controller 152 as a proxy for $V_s$ in order to operate the switch $SW_1$ under ZVS conditions.

For current control, rather than a fixed timer interval of 3.33 microseconds, for example, the timer interval is varied dependent upon the level of $V_{EAO}$. Thus, the timer interval affects the switching frequency for regulating the output voltage in a feedback loop.

The timer interval of 3.33 microseconds corresponds to a switching frequency for peak current control of 300 kHz. In an embodiment, the switching frequency fclamp can be clamped at 500 kHz, 300 kHz, 145 kHz, or some other selected frequency by appropriate selection of timing components.

An output of the switching logic 192 is coupled to a driver 194. The driver 194 generates the signal LOWOUT.

During a switching cycle of the switches $SW_1$ and $SW_2$, the level of $V_s$ rises above the level of $V_{IN}$ immediately upon opening of the low side switch $SW_1$. Under light load conditions, energy stored in the primary side of the transformer $T_1$ is not as effectively transferred to its secondary side. The energy stored in the snubber capacitor $C_{SN}$ can therefore increase with each switching cycle so that it becomes overcharged with energy and so that the level of $V_s$ can ring to an excessively high level upon opening of the low side switch $SW_1$. These effects of a light load condition can be mitigated by turning on the high side switch $SW_2$ earlier in the switching cycle. Thus, in accordance with an embodiment of the present invention, the high side switch $SW_2$ is turned on earlier in the switching cycle under certain light load conditions than it would otherwise be turned on. Similarly, when the input supply voltage $V_{IN}$ is at a high level, this can also result in overcharging the snubber capacitor $C_{SN}$. This can also be mitigated by turning on the high side switch $SW_2$ earlier in the switching cycle. Using frequency control to control switching when the input voltage $V_{IN}$ is at a high level, rather than current control, can also help to mitigate these issues. Thus, in accordance with an embodiment of the present invention, frequency control is used under certain high input voltage conditions.

In an embodiment, a comparator 214 is included in the current control section 186 of FIG. 7 which compares the level of the signal $R_{VIN}$ (which is representative of the voltage $V_{IN}$) to a reference. As shown in FIG. 7, the signal $R_{VIN}$ can be stepped down by a voltage divider that includes resistors $R_{11}$ and $R_{12}$. The stepped down voltage is compared to a reference voltage $VREF_2$. When this comparison indicates that the level of $V_{IN}$ is greater than a threshold (e.g., 226 volts DC), then the output of the comparator 214 disables the comparator 196. As a result, the switch $S_1$ is open and the switch $S_2$ is closed so that the amplifier 200 is active. This causes the frequency control section 188 of the flyback converter control circuitry to primarily control switching, rather than the current control section 186. Thus, the controller of the flyback converter operates in the frequency control mode upon detection of a supply voltage condition (e.g. when $V_{IN}$ is greater than the threshold of 226 volts DC).

FIG. 8 illustrates a differential signal converter 300 for use in control circuitry for a flyback converter in accordance with an embodiment of the present invention. The differential signal converter 300 converts the single-ended signal HON to a differential logic signal READYHIGHON. The logic signal HON is coupled to an input of a first inverter 302. An output of the first inverter 302 is coupled to an input to a second inverter 304 and to control a MOSFET $M_5$. An output of the second inverter 304 is coupled to control a MOSFET $M_6$. A MOSFET $M_7$ and a current source 306 are coupled in series with the MOSFET $M_5$. A MOSFET Mg and a current source 308 are coupled in series with the MOSFET $M_6$. A current source 310 is coupled in series with MOSFET $M_9$ and MOSFET $M_{10}$. A reference current passes through the MOSFETS $M_9$ and $M_{10}$. The signal HON activates one of the MOSFETS $M_5$ or $M_7$ dependent upon the level of HON. The reference current is mirrored in the MOSFET Mg or in the MOSFET $M_7$ dependent upon which of the MOSFETS $M_5$ or $M_7$ is active. The state of the differential signal READYHIGHON is dependent upon which of the MOSFETS $M_5$ or $M_7$ is active. Thus, the converter 300 converts the logic signal HON to the differential logic signal READYHIGHON.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A controller configured to control a power converter, the power converter having a transformer, a low side switch for drawing current from a supply voltage through a primary winding of the transformer and a high side switch for coupling the primary winding of the transformer to a snubber capacitor, wherein the controller is configured to generate drive signals to control the opening and closing of the low side switch and the high side switch to form a regulated output voltage, and wherein the controller is configured to open the high side switch during each of a series of switching cycles when a first voltage generated at a node between the low side switch and the high side switch reaches a determined level, the determined level being higher than the supply voltage by an amount that is adjusted dependent on a monitored level of the supply voltage, wherein when the supply voltage is reduced, the high side switch is opened earlier in the switching cycle, and wherein when the supply voltage is increased, the high side switch is opened later in the switching cycle.

2. The controller according to claim 1, wherein the controller is configured to control a flyback converter that performs DC-to-DC power conversion.

3. The controller according to claim 1, wherein the controller is configured to control the power converter so that the output voltage is formed from a current induced in a secondary winding of the transformer and wherein the output voltage is regulated in a feedback loop.

4. The controller according to claim 1, wherein the controller is configured to adjust the determined level only when the power converter is not 2 under a light load condition.

5. The controller according to claim 4, wherein the controller is configured to detect the light load condition by detecting the output voltage rising above a threshold.

6. The controller according to claim 1, wherein the controller is configured to hold open the high side switch during each switching cycle while the low side switch is closed and then opened and wherein the controller is configured hold open the low side switch while the high side switch is closed and then opened.

7. The controller according to claim 1, wherein the high side switch is closed in accordance with zero volt switching.

8. The controller according to claim 1, wherein the controller is configured to the close the high side switch during each of the series of switching cycles based on a window comparison.

9. The controller according to claim 8, wherein the window comparison compares the first voltage generated at the node between the low side switch and the high side switch to the supply voltage.

10. A switching power supply comprising:
a power converter having a transformer, a low side switch configured to draw current from a supply voltage through a primary winding of the transformer and a high side switch configured to couple the primary winding of the transformer to a snubber capacitor; and
a controller configured to synchronously control the opening and closing of the low side switch and the high side switch, wherein the low side switch and the high side switch are each repeatedly opened and closed in a series of switching cycles so as to form a regulated output voltage, wherein a first voltage is generated at a node between the low side switch and the high side switch, and wherein the controller is further configured to open the high side switch during each switching cycle when the first voltage falls to a determined level and wherein the determined level is higher than the supply voltage by an amount that is adjusted dependent on a monitored level of the supply voltage, wherein when the supply voltage is reduced, the high side switch is opened earlier in the switching cycle, and wherein when the supply voltage is increased, the high side switch is opened later in the switching cycle.

11. The switching power supply according to claim 10, wherein the power converter is a flyback converter configured to perform DC-to-DC power conversion.

12. The switching power supply according to claim 10, wherein the output voltage is formed from a current induced in a secondary winding of the transformer and wherein the output voltage is regulated in a feedback loop.

13. The switching power supply according to claim 10, wherein the controller is configured to adjust the determined level only when the power converter is not under a light load condition.

14. The switching power supply according to claim 13, wherein the light load condition is detected by the output voltage rising above a threshold.

15. The switching power supply according to claim 10, wherein during each switching cycle, the high side switch is held open while the low side switch is closed and then opened and wherein the low side switch is held open while the high side switch is closed and then opened.

16. The switching power supply according to claim 10, wherein the high side switch is closed in accordance with zero volt switching.

17. A controller configured to control a power converter, the power converter having a transformer, a low side switch for drawing current from a supply voltage through a primary winding of the transformer and a high side switch for coupling the primary winding of the transformer to a snubber capacitor, wherein the controller is configured to generate drive signals to control the opening and closing of the low side switch and the high side switch to form a regulated output voltage, and wherein the controller is configured to operate in a first mode in which the high side switch is opened during each switching cycle when a first voltage generated at a node between the low side switch and the high side switch falls to a level of the supply voltage and wherein the controller is configured to operate in a second mode in which the high side switch is opened during each switching cycle when the first voltage falls to a determined level, the determined level being higher than the supply voltage by an amount that is adjusted dependent on a monitored level of the supply voltage, wherein when the supply voltage is reduced, the high side switch is opened earlier in the switching cycle, and wherein when the supply voltage is increased, the high side switch is opened later in the switching cycle.

18. The controller according to claim 17, wherein the controller is configured to control a flyback converter that performs DC-to-DC power conversion.

19. The controller according to claim 17, wherein the controller is configured to control the power converter so that the output voltage is formed from a current induced in a secondary winding of the transformer and wherein the output voltage is regulated in a feedback loop.

20. The controller according to claim 17, wherein the controller is configured to operate in the first mode when the power converter is under a light load condition and otherwise the controller is configured to operate in the second mode.

21. The controller according to claim 20, wherein the controller is configured to detect the light load condition by detecting the output voltage rising above a threshold.

22. The controller according to claim 17, wherein the controller is configured to hold open the high side switch during each switching cycle while the low side switch is closed and then opened and wherein the controller is configured hold open the low side switch while the high side switch is closed and then opened.

23. The controller according to claim 17, wherein the high side switch is closed in accordance with zero volt switching.

24. A switching power supply comprising:
a power converter having a transformer, a low side switch configured to draw current from a supply voltage through a primary winding of the transformer and a high side switch configured to couple the primary winding of the transformer to a snubber capacitor; and
a controller configured to synchronously control the opening and closing of the low side switch and the high side switch, wherein the low side switch and the high side switch are each repeatedly opened and closed in a series of switching cycles so as to form a regulated output voltage, wherein a first voltage is generated at a node between the low side switch and the high side switch, and wherein the controller is further configured to operate in a first mode in which the high side switch is opened during each switching cycle when the first voltage falls to a level of the supply voltage and wherein the controller is configured to operate in a second mode in which the high side switch is opened during each switching cycle when the first voltage falls to a determined level and wherein the determined level is higher than the supply voltage by an amount that is adjusted dependent on a monitored level of the supply voltage, wherein when the supply voltage is reduced, the high side switch is opened earlier in the switching cycle, and wherein when the supply voltage is increased, the high side switch is opened later in the switching cycle.

25. The switching power supply according to claim 24, wherein the power converter is a flyback converter configured to perform DC-to-DC power conversion.

26. The switching power supply according to claim 24, wherein the output voltage is formed from a current induced in a secondary winding of the transformer and wherein the output voltage is regulated in a feedback loop.

27. The switching power supply according to claim 24, wherein the controller is configured to operate in the first mode when the power converter is under a light load condition and otherwise the controller is configured to operate in the second mode.

28. The switching power supply according to claim 27, wherein the light load condition is detected by the output voltage rising above a threshold.

29. The switching power supply according to claim 24, wherein during each switching cycle, the high side switch is held open while the low side switch is closed and then opened and wherein the low side switch is held open while the high side switch is closed and then opened.

30. The switching power supply according to claim 24, wherein the high side switch is closed in accordance with zero volt switching.

* * * * *